United States Patent Office 3,178,437
Patented Apr. 13, 1965

3,178,437
PROCESS FOR SIMULTANEOUSLY PRODUCING PROLINOLS AND 3-HYDROXY-PIPERIDINES
Maurice Soulal, London, England, assignor to Beecham Research Laboratories Limited, Betchworth, England, a British company
No Drawing. Filed Feb. 17, 1958, Ser. No. 715,498
1 Claim. (Cl. 260—294.7)

This invention relates to improvements in or relating to the production of N-substituted 2-hydroxymethyl pyrrolidines, herein referred to as N-substituted prolinols, and N-substituted-3-hydroxy-piperidines.

N-methylprolinol (that is, N-methyl-2-hydroxymethyl pyrrolidine) has hitherto been made by the reduction of ethyl pyroglutamate with lithium aluminum hydride followed by reaction with chloral and reduction of the N-formyl derivative thus formed again with lithium aluminum hydride. Blicke and Lu, J. Amer. Chem. Soc., 1955, 77, 29; U.S. Patent 2,695,301). It has also been prepared from ethyl 1-methylpyrrole-2-carboxylate by reduction with sodium and ethanol (Renshaw and Cass, J. Amer. Chem. Soc., 1939, 61, 1195). These methods suffer from the disadvantage of requiring expenisve starting materials or expensive reagents for the preparation of the required product.

It has now been found that N-methyl prolinol and certain other N-substituted prolinols (which are valuable intermediates for the preparation of therapeutic substances) as well as the isomeric N-substituted-3-hydroxy-piperidines can be obtained by a process using cheap starting materials which enables these N-substituted prolinols to be obtained much more cheaply than by any process described hitherto.

According to the present invention, N-substituted prolinols are prepared by a process in which an ester of a 2:5-dihalogenoamyl alcohol of the general formula:

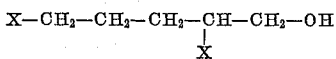

in which X is an atom of bromine or chlorine is reacted with a primary alkylamine or hydroxy-alkylamine having an alkyl group containing from 1 to 4 carbon atoms inclusive.

Primary alkylamines and hydroxy-alkylamines which can be used in the present invention include methylamine, ethylamine, n-propylamine, iso-propylamine, butylamines and 2-hydroxyethylamine.

The acid from which the ester of the 2:5-diahalogenoamyl alcohol is derived can be any suitable one chosen from a wide range of acids. Suitable esters include those derived from alkyl carboxylic acids having from 1 to 6 carbon atoms inclusive in the alkyl group, for example acetic and propionic acids; and aryl carboxylic acids, for example benzoic acid. In the preparation of N-methyl prolinol by the process of this invention it has been found convenient to use as a 2:5-dihalogenoamyl ester a 2:5-dihalogenoamyl acetate and especially 2:5-dibromoamyl acetate.

The dihalogenoamyl alcohol ester, for example a dihalogenoamyl acetate may be obtained by the reaction of tetrahydrofurfuryl alcohol with hydrogen bromide in the presence of an alkyl carboxylic acid, for example acetic acid.

Alternatively the dihalogenoamyl alcohol ester may be obtained by the reaction of a tetrahydrofurfuryl alcohol ester with hydrogen bromide.

The process of this invention usually provides, in addition to the desired N-substituted prolinol, a quantity of an isomeric N-substituted-3-hydroxy-piperidine which can be separated from the N-substituted prolinol by fractional distillation. These N-substituted-3-hydroxy-piperidines are themselves valuable compounds which are useful as intermediates in the preparation of therapeutic substances, but even if they are regarded as valueless, N-substituted prolinols are obtained cheaply by the process of this invention in comparison with the methods described hitherto.

In some instances, the product of the process of this invention is obtained in the form of the corresponding ester of the N-substituted prolinol. However, the N-substituted prolinol itself can readily be obtained by hydrolysing the ester, for example by treatment with an alkali such as a sodium hydroxide solution.

Where the N-substituted prolinol is obtained directly from the process of this invention there is also obtained as a by-product an alkyl-substituted amide formed by the interaction of the primary alkylamine with the ester grouping of the acid liberated from the 2:5-dihalogenoamyl ester. In some instances it is difficult to separate the alkyl-substituted amide from the N-substituted prolinol, but this difficulty can be readily overcome by hydrolysing the amide, for example with an alkali such as a sodium hydroxide solution.

Where the process of this invention provides an N-substituted 3-hydroxy-piperidine in addition to an N-substituted prolinol the former compound is sometimes obtained in the form of the ester corresponding to the ester of the dibromoamyl alcohol used as a starting product. In such instances the N-substituted-3-hydroxy-piperidine itself can be obtained by treating its ester with an alkali in a similar way to that described above in connection with the N-substituted prolinols.

The process of this invention can be performed in the presence of a solvent for the reactants, but this is not essential. Suitable solvents include lower alkanols, for example ethanol; ether, benzene and dioxan. Where no solvent is used, it has been found preferable to use the primary alkylamine in excess in order to obtain the most complete reaction between the reactants.

The temperature at which the process is carried out is not critical and depends largely upon the reactants used and the nature of the solvent used. Where a solvent is used, it is convenient to achieve satisfactory reaction by heating the solution of reactants under reflux.

The following examples illustrate the invention:

(1) To an ethanolic solution of methylamine (200 gm. of 33% w./v. corresponding to 6 mols.) in a flask fitted with a brine condenser and carbon dioxide/acetone trap, was added dibromoamyl acetate (100 gm.). After some 10 minutes a vigorous reaction took place and the reaction boiled. When this initial reaction had subsided the mixture was heated under reflux for 6 hours. The alcohol was distilled off at atmospheric pressure and sodium hydroxide solution was added (120 ml. of 25%), the mixture heated for a further hour and then extracted continuously with ether. The ether after drying with magnesium sulphate was removed and the residue fractionally distilled under reduced pressure to give N-methylprolinol, B.P. 74–78° C./12 mm. and N-methyl-3-hydroxypiperidine.

The dibromoamyl acetate used in this example and also in Examples 2, 4, 5 and 7 to 13 was obtained as follows:

A suspension of anhydrous calcium sulphate (272 gm.) in a mixture of ethylene dichloride (200 ml.) and tetrahydrofurfuryl acetate (100 gm.) was stirred whilst dry hydrogen bromide (141 gm.) was passed in and the temperature of the mixture was maintained between 5° C. and 10° C. When the reaction was complete the mixture was allowed to stand at room temperature overnight, filtered, poured into water, and the organic layer washed with dilute alkali. After drying and removing the solvent the product was distilled to give dibromoamyl acetate, B.P. 123–5° C./4 mm., $n_D^{20}$ 1.4987. Yield, 149.7 gm., 75%.

(2) Example 1 was repeated using dibromoamyl acetate obtained by the method described at the end of Example 1 except that no calcium sulphate was used.

(3) Example 1 was repeated using dibromoamyl acetate which was obtained by the following process:

Hydrogen bromide (84.5 gm.) was passed into a solution of tetrahydrofurfuryl alcohol (105 gm.) in glacial acetic acid (40 ml.), the temperature of the reaction mixture being maintained at about 40° C. When the reaction was complete the mixture was allowed to stand at room temperature for 4 days after which time it was poured into water, the resulting oil obtained washed with dilute alkali, dried and distilled to give dibromoamyl acetate (215 gm., yield, 75%).

(4) Dibromoamyl acetate (864 gm., 3 gm.-mols.) was slowly added with stirring to iso-propylamine (885 gm., 15 gm.-mols.). When the initial reaction was complete the mixture was refluxed on a steam bath for 2 hours.

Sodium hydroxide solution (25%, 1680 ml.) was added to the reaction mixture which was then heated for a further hour. The iso-propylamine was distilled off and the solution extracted with ether, the extract was dried, the ether removed and the residue fractionated to give a mixture of N-iso-propylprolinol and N-isopropyl-3-hydroxy-piperidine.

The N-iso-propylprolinol was obtained as a colourless liquid B.P. 94-98° C./17 mm., (247.5 gm., yield 43%), which when reacted with methyl iodide gave a quaternary salt, M.P. 266–70° C. This melting point was not depressed by a salt obtained by the reaction of N-methyl prolinol and iso-propyl iodide The N-iso-propyl-3-hydroxy-piperidine was obtained as a liquid B.P. 99-99.5° C./17 mm. which when reacted with methyl iodide gave a quaternary salt M.P. 254° C. This melting point was not depressed by the salt obtained by the reaction of N-methyl-3-hydroxy-piperidine and iso-propyl iodide.

(5) To a solution of monoethanolamine (106 gm.) in ethanol (100 ml.) was added dibromoamyl acetate (100 gm.). After the initial vigorous reaction, the mixture was heated on a steam bath for 16 hours. The ethanol was removed and the residue hydrolysed with sodium hydroxide. The solution was continuously extracted with ether, the extract dried, the solvent removed and the residue (41.2 gm.) distilled to give a mixture of N-2'-hydroxyethylprolinol and N - (2' - hydroxyethyl) - 3-hydroxy-piperidine boiling between 132 and 134° C., $n_D^{22}$ 1.4948.

(6) Methylamine (93 gm., 3 gm.-mols.) was bubbled into a solution of dibromoamyl propionate (302 gm.) in benzene (300 ml.) at 40° C. The addition required 2.5 hours. After all the amine had been added the mixture was heated on a steam bath for 1 hour, sodium hydroxide (3 gm.-mols.) added as a 45% solution and the mixture heated for 30 minutes. The benzene layer was separated, dried and combined with the ether extract of the aqueous layer. After removal of the solvents a mixture (86.7 gm.) of N-methylprolinol and N-methyl-3-hydroxy-piperidine was obtained.

The dibromoamyl propionate used in this example was obtained by the process described at the end of Example 3 except that propionic acid was used instead of glacial acetic acid. The dibromoamyl propionate was obtained in 72% yield as a colourless liquid, B.P. 117° C./1 mm. $n_D^{22}$ 1.4983.

(7) Methylamine (93 gm., 3 gm.-mols.) was led into a solution of dibromoamyl acetate (288 gm., 1 gm.-mol.) in ethanol (1 litre) during 2.5 hours. At the end of this time the mixture was heated on a steam bath for 1 hour. Sodium hydroxide was added and the mixture heated for 30 minutes. The solution was steam distilled, the distillate acidified and evaporated to dryness, the residue was basified and extracted with ether. After removal of the solvent the residue (94.9 gm.) was distilled, giving 72.6 gm. of a mixture of N-methylprolinol and N-methyl-3-hydroxy-piperidine.

(8) Example 7 was repeated but using 2 litres of ethanol. The yield of the mixture was 74.5 gm.

(9) Methylamine (93 gm., 3 gm.-mols.) was bubbled into a solution of dibromoamyl acetate (288 gm., 1 gm.-mol.) in dioxan (300 ml.) at 30° C. The addition required 3 hours. After all the gas had been added the mixture was stirred for 1 hour at room temperature and 1 hour on a steam bath. The dioxan was distilled off, sodium hydroxide (4 gm.-mols.) added and the mixture heated for a further hour. The solution was extracted with ether, the extract was dried, the solvent removed and the residue distilled to give 54.5 gm. of a mixture of N-methylprolinol and N-methyl-3-hydroxy-piperidine.

(10) Methylamine (93 gm., 3 gm.-mols.) was bubbled into dibromoamyl acetate (288 gm., 1 gm.-mol.) at 40° C. The addition required 2.5 hours. The mixture was then stirred at room temperature for 1 hour and on the steam bath for the same time. The mixture was basified by the addition of sodium hydroxide (240 ml. 50%), heated for 30 minutes and extracted with ether. From the extract 88.8 gm. of material was obtained which was distilled, giving 58.6 gm. of a mixture of N-methylprolinol and N-methyl-3-hydroxy-piperidine.

(11) To methylamine (124 gm., 4 gm.-mols.) cooled to −5° C., was added dibromoamyl acetate (288 gm., 1 gm.-mol.) with stirring. There was an induction period of some minutes during which only a portion of the ester was added. When all the ester had been added the mixture was stirred and heated on a steam bath for 1 hour, basified by the addition of sodium hydroxide (3 gm.-mols.), heated for 30 minutes and extracted with ether. The ether extract after drying and removal of the solvent was distilled. This gave 72.2 gm. of a mixture boiling between 66 and 76° C. at 11 mm. from which there was obtained by fractionation 32 gm. of N-methylprolinol and 33.5 gm. of N-methyl-3-hydroxy-piperidine.

(12) Methylamine (62 gm., 2 gm.-mols.) was bubbled into a solution of dibromoamyl acetate (288 gm., 1 gm.-mol.) in benzene (300 ml.) at 40° C. When it had all been added (2.5 hours) the mixture was heated for 1 hour and hydrolysed with sodium hydroxide for 2 hours on a steam bath. The benzene layer was separated and the aqueous solution extracted with ether. The combined extracts (87.3 gm.) after removal of the solvent were distilled, giving 41.8 gm. of a mixture of N-methyl-prolinol and N-methyl-3-hydroxy-piperidine.

(13) Example 12 was repeated using 3, 5 and 10 gm.-mols. of methylamine, with similar results.

(14) Dibromoamyl benzoate (350 gm., 1 gm.-mol.) was added slowly to a solution of methylamine (93 gm., 3 gm.-mols.) in ether. When the resulting reaction was complete the unreacted methylamine and the ether were removed by distillation and the residue was extracted with dilute hydrochloric acid. The acid extract was neutralised with sodium hydroxide solution and then continuously extracted with ether. The ether extract obtained was removed from the aqueous layer and the ether removed by distillation leaving a mixture of N-methylprolinol and N-methyl-3-hydroxy-piperidine benzoate.

The dibromoamyl benzoate used in this example was obtained as follows:

Dry hydrogen bromide (302 gm.) was passed into tetrahydrofurfuryl benzoate (407 gm.), the reaction mixture being allowed to warm up as the reaction proceeded. The reaction mixture was then poured into water causing an oil to separate which was washed with dilute alkali, dried and fractionally distilled. Dibromoamyl benzoate was obtained in 72% yield as a liquid B.P. 176° C./1.5 mm., $n_D^{20}$ 1.5503.

What I claim is:

A process for the preparation of N-substituted prolinols which comprises reacting a carboxylic acid ester, whereof the carboxylic acid is selected from the group consisting of alkyl carboxylic acids having 1 to 6 carbon atoms in the alkyl group and aryl carboxylic acids, of a 2:5-di-halogeno-amyl alcohol of the general formula:

$$X-CH_2-CH_2-CH_2-CH(X)-CH_2-OH$$

in which X is a halogen having an atomic weight greater than 30 and less than 90, with an alkylamine in which the alkyl group contains from 1 to 4 carbon atoms inclusive, selected from the group consisting of primayl alkylamines and hydroxy alkylamines, to produce a mixture of N-substituted prolinols and an isomeric N-substituted-3-hydroxy-piperidine.

References Cited in the file of this patent

UNITED STATES PATENTS 2,838,521     Lunsford _____ June 10, 1958

FOREIGN PATENTS 1,000,310     France _____ Oct. 10, 1951

OTHER REFERENCES

Hill et al.: J.A.C.S., vol. 76, 3549 (1954).